United States Patent Office 3,089,753
Patented May 14, 1963

3,089,753
HYDROGEN PEROXIDE STABILIZATION
Robert E. Meeker, Berkeley, Calif., assignor to Shell Oil Company, a corporation of Delaware
No Drawing. Filed Dec. 31, 1959, Ser. No. 863,067
12 Claims. (Cl. 23—207.5)

This invention relates to a new and improved method for inhibiting the decomposition of hydrogen peroxide during storage, transportation and use. It deals with an especially advantageous combination of peroxide stabilizing agents which can be used to suppress such decomposition over long periods even at elevated temperatures.

Because of the danger of loss of hydrogen peroxide as a result of decomposition to oxygen and water, it has long been the practice to add a stabilizer to hydrogen peroxide solutions to reduce the rate of the decomposition reaction. Sodium stannate has been widely used for this purpose. It is quite effective under many conditions but has the great disadvantage that it is coagulated by positive ions [Schumb, Satterfield and Wentworth, "Hydrogen Peroxide," ACS Monograph No. 128, page 537 (Reinhold Publishing Corp., New York, 1955)]. The coagulated form is ineffective as a stabilizer. The aluminum ions which are introduced into hydrogen peroxide by corrosion of the aluminum metal with which it comes into contact are especially effective coagulants of stannate. Since aluminum is the favored material for construction of the drums, tanks, pipes, etc. in which hydrogen peroxide is commonly shipped, stored and used, the effectiveness of sodium stannate as a decomposition inhibitor is seriously impaired.

It is an important object of the present invention to provide a method of overcoming the foregoing serious limitation to the effectiveness of stannate inhibitors of hydrogen peroxide decomposition. Another object is the provision of hydrogen peroxide stabilized with a combination of a stannate and an organic stabilizer of a special type which is effective in protecting the stannate from coagulation and which is itself protected as a result of the presence of the stannate from the attack by hydrogen peroxide which causes most organic stabilizers to have only a relatively short effective life. Another special object is the provision of a three-component stabilizer mixture which has outstanding advantages in stabilizing hydrogen peroxide. Still other objects and advantages of the invention will be apparent from the following description of some of the suitable methods whereby it can be successfully applied in stabilizing hydrogen peroxide of various concentrations.

It has been found that mixtures of at least one water-soluble polycarboxy amine which has a trivalent amino nitrogen atom to which at least two carboxyl groups are linked by saturated aliphatic hydrocarbon groups of not more than two carbon atoms each, together with a soluble stannate have unexpected advantages when used in hydrogen peroxide. Not only are these polycarboxy amines themselves stabilizers of hydrogen peroxide but also they are effective stabilizers of stannates in hydrogen peroxide solutions. By using this special type of polycarboxy amine in combination with a stannate in hydrogen peroxide, coagulation of the stannate by aluminum or other positive ions is avoided and the effectiveness of the stannate as a hydrogen peroxide stabilizer is thus greatly increased. This is believed to be due to the fact that these polycarboxy polyamines are capable of complexing with aluminum ions and preventing their coagulating effect on the stannate. Furthermore, there is a stabilizing action of the stannate on these polycarboxy amines as a result of which these amines are protected from oxidation by the hydrogen peroxide. The polycarboxy amines of the indicated special structure thus form a unique combination with stannate stabilizers of hydrogen peroxide in which each of these stabilizers protects the other and the two together give improved protection to the peroxide.

In accordance with the invention, therefore, hydrogen peroxide is stabilized with a mixture of a stannate and one or more water-soluble polycarboxy amines which have at least one amino nitrogen atom to which is linked two carboxy groups directly joined to said nitrogen atom by saturated aliphatic hydrocarbon groups of one to two carbon atoms, and/or soluble salts of these polycarboxy amines. A special feature of the invention in one of its more specific modifications comprises the use of the foregoing synergistic combination of hydrogen peroxide stabilizers with a phosphate to obtain still further improved results.

The stabilizing action which the stannate has on the polycarboxy amine stabilizers appears to be due to the ability of the stannate to complex with heavy metal ions in their reduced valence state (ferrous, cuprous, chromous and like ions). Such ions are present to a certain small extent at least in all peroxide containing the corresponding metals because of the alternate oxidation and reduction which hydrogen peroxide effects on dissolved multivalent metals. It has been found that the polycarboxy amine stabilizers of the previously described structure form complexes with the ions of multivalent metals in both their reduced and higher valence states. The complexes formed with the heavy metal ions in the reduced state, in contrast with those formed from the higher valence ions, react readily with the hydrogen peroxide according to the Fenton reaction, J. Chem. Soc., vol. 65, page 899 (1894), for example. The loss of polycarboxy amine stabilizer which results from this reaction is prevented by the stannate which by complexing with the heavy metal ions in their reduced (as well as in their higher valence) state prevents formation of the oxidation susceptible complexes between reduced valence metal ions and polycarboxy amines. As previously pointed out, the stannate is simultaneously protected by the polycarboxy amine from coagulation to an ineffective form by positive ions, particularly the aluminum ions introduced as a result of contact of the hydrogen peroxide with aluminum metal containers. The detrimental effect of aluminum ions on the effectiveness of sodium stannate as a stabilizer of hydrogen peroxide is shown by the following results of tests made with 35% hydrogen peroxide containing 0.1 milligram of iron and 0.02 milligram of copper per liter added in the form of sulfates.

| Sodium stannate, mg. per liter | Aluminum as $Al^{+3}$, mg. per liter | pH of solution | $H_2O_2$ decomposition rate, percent per day at 100° C. |
|---|---|---|---|
| None | None | 3.3 | 700 |
| 10 | None | 3.0 | 6.6 |
| 10 | 0.3 | 3.1 | 80 |
| 10 | 10 | 3.1 | 120 |

The two new stabilizers together avoid this difficulty and have a longer effective life than the sum of their lives when used separately.

In the past it has been necessary to use massive amounts of stannate, e.g. 100 to 500 milligrams of $Na_2Sn(OH)_6$ per liter of $H_2O_2$ solution, in order to minimize the harmful effects of aluminum ions in coagulating the stannate. Even so, aluminum ions often render the stannate incapable of stabilizing $H_2O_2$ solutions adequately. Furthermore such massive amounts of stannate are harmful in certain end uses of the hydrogen peroxide. For example, when the $H_2O_2$ is used as a reagent for the epoxidation of certain oils, such high concentrations of stannate are injurious to the quality of the epoxidized oil product. Also, such high concentrations of stannate interfere with certain applications of 90% weight $H_2O_2$. It is a particular advantage of the present invention in one of its modifications that by means of the new combination of stabilizers the stannate concentration can be reduced to trace levels, e.g. 0.5 to 10 milligrams per liter, and still provide reliable stabilization of the $H_2O_2$, even in the presence of aluminum ions.

The two component inhibitor combination of the invention is made even more effective in stabilizing hydrogen peroxide by the addition of a soluble phosphate. The phosphate also complexes aluminum ions and thus makes it feasible to use smaller amounts of the more expensive polycarboxy amine stabilizer. Even more important, the phosphate protects the polcarboxy amine from attack by the hydrogen peroxide after aluminum corrosion has proceeded to the point at which the capacity of the polycarboxy amine for complexing aluminum is exceeded and the stannate can be deactivated by coagulation. As a result, this new three-component inhibitor of hydrogen peroxide decomposition has a very long effective life and is capable of stabilizing hydrogen peroxide under adverse conditions at which prior stabilizers fail. It is especially useful for stabilizing hydrogen peroxide when in contact with aluminum containers but its usefulness is not restricted to this application of the invention.

The polycarboxy amine stabilizers used in the invention contain at least one N,N-dicarboxyhydrocarbylamino group, —N(—R—COOX)$_2$, where each R is a saturated aliphatic hydrocarbon group which links a —COOX group to the amino nitrogen atom by one to two carbon atoms, most preferably an alkylene radical containing up to two carbon atoms. X is hydrogen or a salt-forming cation such, for instance as an alkali metal or alkaline earth metal or ammonium ion, the two indicated X's being the same or different. U.S. Patent 2,371,623 describes a number of polycarboxy amines of this kind which can be successfully used together with a soluble stannate in the new compositions of the invention. Especially advantageous are those polycarboxy amines which contain a plurality of N,N-dicarboxyalkylamino groups in the molecule, especially those having at least two adjacent carbon atoms to each of which is directly attached at least one of said N,N-dicarboxyalkylamino group. In copending application of Robert E. Meeker, Serial No. 777,209, filed December 1, 1958, there is described a particularly suitable sub-group of polycarboxy amines of this preferred type, namely, the water-soluble N,N-(dicarboxyalkyl) amino-substituted carbocyclic compounds having a saturated carbocyclic ring with at least two adjacent ring carbon atoms each directly linked to the nitrogen atom of an N,N-di(carboxyalkyl)amino group containing up to two carbon atoms in each of said alkyl radicals. Typical of the hydrogen peroxide stabilizers of this type which are described are the water-soluble 1,2-diaminocycloalkane-N,N,N',N'-tetraacetic acids and their salts having 5 to 18 carbon atoms in the cycloalkane radical, such as 1,2-diaminocyclopentane-N,N,N',N'-tetraacetic acid, disodium 1,2 - diaminocyclohexane - N,N, N',N'-tetraacetic acid, tetra - potassium 1,2 - diaminoperhydronaphthalene-N,N,N',N'-tetraacetic acid, tri-ammonium 4,7-diisobutyl-1,2-diaminoperhydronaphthalene-N, N,N',N'-tetraacetic acid and the like. By the present invention the effectiveness of these stabilizers can be increased and other types of water-soluble polycarboxy amines having at least one trivalent nitrogen atom to which at least two carboxyl groups are directly attached, said carboxyl groups being each linked to said nitrogen atom by a saturated aliphatic hydrocarbon group of not more than two carbon atoms, can be made effective stabilizers for hydrogen peroxide.

Another useful type of polycarboxy amine which can be used in the invention is the water-soluble alkylene polyamino polycarboxylic acids having up to three carbon atoms in the carboxylic acid groups and their salts such as ethylenediamine-N,N,N',N'-tetraacetic acid which is sold by Geigy Chemical Corporation under the trade name Sequestrene and its tetrasodium salt sold by Dow Chemical Company as Versene; 1,2-diaminopropane-N, N,N',N'-tetraacetic acid; 1,3-diaminopropane-N,N,N',N'-tetrapropionic acid; 1,2-diaminobutane-N,N,N',N'-tetraacetic acid; 2,3-diaminobutane-N,N,N',N'-tetraacetic acid; and the like and their soluble mono-, di-, tri- and tetra-alkali metal, alkaline earth metal and ammonium salts. Representative examples of aromatic polyamino polycarboxylic acids which can be used as such or in the form of water-soluble salts are: 1,2-diaminobenzene-N,N,N', N'-tetraacetic acid; 3,4-diaminodiphenyl-N,N,N',N'-tetraacetic acid; 1,2 - diaminoanthracene-N,N,N',N'-tetraacetic acid, 1,2,3 - triaminobenezene - N,N,N',N',N'',N'' - hexaacetic acid, and the like. All of these compounds can be produced by reacting the corresponding amines with halocarboxylic acids using the method of U.S. Patent 2,-130,505 for example Belgian Patent 567,330 describes polycarboxy amines of the formula

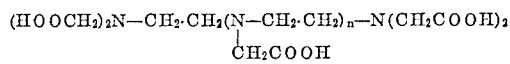

where $n$ is a positive number, preferably 1 to 4, which are also useful in the invention both as the free acids and their salts.

The stannate used in combination with the foregoing polycarboxy amines can be stannic acid or a salt thereof having a solubility in water of at least 0.5 milligram per liter at about 15° C. Incompletely dissolved stannates can be used as well as those which are completely in solution when undissolved material is not objectionable in the peroxide. Alkali metal or ammonium metastannates are especially useful and sodium and potassium stannates are particularly preferred because of their availability at reasonable prices.

The soluble phosphate compounds which can be used with the chosen polycarboxyalkyl amine chelating agent and stannate can be any of the numerous phosphates which form complexes with heavy metal ions in aqueous solutions. Orthophosphates and metaphosphates, for example, can be used but the polyphosphates such as the pyrophosphates, the polymetaphosphates, particularly the hexametaphosphates, the tripolyphosphate and the tetraphosphates, for instance, offer special advantages in the invention. The soluble phosphates are preferably added in the form of their salts, the alkali metal salts, especially the sodium and potassium salts, being particularly useful because of their availability and low cost, although ammonium or other soluble salts can be employed, as can the corresponding free acids. Salt corresponding to complete or partial neutralization of the acid, for instance, primary salts such as $Na_2HPO_4$ or tertiary salts such as $Na_3PO_4$ can be added to the hydrogen peroxide in making the compositions of the invention. Instead of inorganic salts one can use amine salts or phosphate esters of any of the previously indicated phosphorus-containing acids although as a general rule these are more expensive and so are less desirable.

The amounts of polycarboxy amine and stannate which can be used in stabilizing hydrogen peroxide according to the invention can be varied. The severity of the conditions to which the peroxide is to be exposed and its purity, especially with respect to heavy metal which are catalysts for its decomposition, are factors to be considered in determining the concentrations of the stabilizers which will be most desirable. As a general rule about 1 to about 1,000 milligrams of polycarboxy amine per liter of hydrogen peroxide will be suitable, but amounts between about 10 and about 150 milligrams per liter are usually more advantageous. An amount which is stoichiometrically equivalent to the highest aluminum concentration expected in the peroxide, i.e., about 1 mole per mole of aluminum ion, has special advantage. However, smaller amounts are suitable especially when using phosphate as one of the components of the stabilized mixture.

The amount of stannate which can be employed together with the chosen polycarboxy amine or mixture of polycarboxy amines will generally be in the range of about 0.5 to about 1,000 milligrams per liter of hydrogen peroxide solution being stabilized. More usually amounts of about 2 to about 100 milligrams per liter of peroxide will be desirable. As a minimum one should use sufficient stannate to complex with all the heavy metal ions which are expected as contaminants of the hydrogen peroxide during the period the stannate is to function as peroxide stabilizer in combination with the polycarboxy amine. It is a special feature of the invention that the new polycarboxy amine-stannate inhibitor mixtures can be used successfully to stabilize hydrogen peroxide solutions of 90% or higher concentrations which are intended for uses in which the tin content must be kept at a very low level, i.e., equivalent to about 10 milligrams of sodium stannate per liter of peroxide as a maximum. It has been found that the polycarboxy amine stabilizers of the previously indicated structure do not interfere in the use of such concentrated peroxide when present in amounts as high as 50 milligrams per liter. As a result, mixtures of about 0.5 to about 10 milligrams of sodium stannate or equivalent amounts of other soluble stannate with about 10 to about 100 milligrams of polycarboxy amine per liter can be used to make the storage and handling of 90% or higher concentration hydrogen peroxide safer and more reliable without undesirable effect on the final use of the peroxide.

When employing the new three component stabilizer combination, it is advantageous to use about 10 to about 1000 milligrams of phosphate per liter of hydrogen peroxide solution. Usually about 50 to about 250 milligrams of phosphate per liter of peroxide are more advantageous.

The new stabilizers can be introduced into the hydrogen peroxide in any suitable manner. The polycarboxy amine and stannate can be dissolved in the peroxide simultaneously or successively and the phosphate, if used, can be added at the same time or sooner or later. Most preferably the hydrogen peroxide is maintained acidic during stabilization with the new inhibitor combinations and advantageously at a pH of about 1.5 to about 5.5 which can conveniently be obtained by addition of nitric or phosphoric acid or the like. The pH here referred to is that known as the aqueous equivalent pH which is determined by direct reading of a pH meter corrected for concentration effects as described by J. R. Kolczynski et al. in the Journal of the American Chemical Society, vol. 79, page 531 (1957). A pH of about 4.0 to 4.5 is especially advantageous in stabilization with the mixtures of the invention because in this range not only does the the stabilizer mixture have a long effective life even at temperatures of about 100° C. but also the corrosion of aluminum containers is reduced.

The following examples further illustrate some of the suitable methods of applying the new hydrogen peroxide stabilizer combinations of the invention and show some of their advantages.

Example I

The effectiveness of ethylene diamine-N,N,N',N'-tetraacetic acid (EDTA) as the polycarboxy amine when used in combination with sodium stannate for stabilizing 35% hydrogen peroxide containing 110 milligrams of sodium pyrophosphate per liter of peroxide solution was demonstrated in tests carried out in 100 ml. volumetric flasks by adding aliquots of concentrated solutions of the indicated amounts of the additives to the hydrogen peroxide. The pH was adjusted and after thorough mixing each test solution was divided. Half was used for the decomposition rate determination which was carried out by measuring the rate of oxygen evolution during heating by immersion in a 100° C. bath for the indicated test periods. The other half was used for pH measurement thus avoiding contamination of the test solution by the pH meter electrodes. All glassware in contact with the solutions was thoroughly cleaned and passivated before each test by successive treatment with 10% NaOH, 35% $HNO_3$ and 90% $H_2O_2$, each for about 24 hours at room temperature, with rinses with deionized water between each treatment.

| Direct pH reading on test solution, initial pH | Stabilizers, mg. per liter | | $H_2O_2$ decomposition rate, percent per day at 100° C. | Effective life of stabilizer mixture, hrs. at 100° C. |
| --- | --- | --- | --- | --- |
| | EDTA | Sodium stannate | | |
| 2.5 | None | 11 | 33 | |
| 2.5 | 50 | 11 | 1.1 | 18 |
| 2.4 | None | 110 | 5.5 | |
| 2.4 | 50 | 110 | 1.4 | 18 |

Example II

Tests which simulate conditions during storage of 35% hydrogen peroxide in aluminum drums were carried out by heating the stabilized peroxide with added aluminum sulfate and then adding ferrous and cupric sulfates to supply the metal ions (0.1 mg. $Fe^{+++}$ and 0.02 mg. $Cu^{++}$ per liter) which would be introduced through corrosion of the drum.

The tests were carried out in 100 ml. flasks in a manner analogous to that used in Example I.

The polycarboxy amine used was 1,2-diaminocyclohexane-N,N,N',N'-tetraacetic acid which was added in dilute ammonia solution to facilitate rapid incorporation. The stannate was sodium stannate and the phosphate was sodium pyrophosphate. The pH was adjusted to 3.2 to 3.3 direct reading initially in each case.

| Stabilizers added, mg. per liter | | | Aluminum present, mg. per liter | Percent loss of $H_2O_2$ in 24 hrs at 100° C. | |
| --- | --- | --- | --- | --- | --- |
| Polycarboxyamine | Stannate | Phosphate | | Initial rate | 24-hour test |
| None | None | None | None | 700 | |
| 50 | 10 | None | 3 | 2.4 | 2.4 |
| 50 | 10 | 110 | 5 | 1.9 | 1.9 |
| 100 | 10 | None | 5 | 2.1 | 2.1 |
| 50 | 50 | 110 | 10 | 1.4 | 1.4 |

Example III

Stabilization of hydrogen peroxide of different concentrations by means of 1,2-diamino-cyclohexane-N,N,N',N'-tetraacetic acid and sodium stannate is shown by the following results of tests conducted in 100 ml. flasks as described in Example I. In all cases the peroxide contained 0.1 milligram of iron and 0.02 milligram of copper per liter.

| $H_2O_2$ concentration, weight percent | Amount of stabilizer, mg. per liter | | Initial pH by direct reading | Percent loss in $H_2O_2$ in 24 hrs. at 100° C. | |
| --- | --- | --- | --- | --- | --- |
| | Polycarboxy amine | Stannate | | Initial rate | Total for 24 hours |
| 35 | None | None | 3.3 | 700 | |
| 35 | 50 | 10 | 2.9 | 0.8 | 0.8 |
| 35 | 50 | 50 | 3.4 | 0.4 | 0.4 |
| 50 | None | None | 2.2 | 600 | |
| 50 | 50 | 50 | 3.15 | 0.6 | 0.6 |
| 70 | None | None | 2.3 | 106 | |
| 70 | 50 | 10 | 2.1 | 0.8 | 0.8 |
| 90 | None | None | 0.5 | 80 | |
| 90 | 25 | 10 | 0.1 | 0.2 | 0.2 |

Example IV

Effective stabilization of hydrogen peroxide using only trace quantities of stannate is illustrated in the following test, conducted as described in Example I. A sample of 90% w. $H_2O_2$ was contaminated by adding 0.02 milligram of ferrous ion and 0.005 milligram of cupric ion per liter of solution. An aliquot was found to decompose at the rate of 2.4% per day at 100° C. and direct pH reading 0.3. Another aliquot was stabilized by adding 2 milligrams of 1,2-diaminocyclohexane-N,N,N',N'-tetraacetic acid per liter of solution and adjusting the direct pH reading to 0.2. The resulting stabilized solution decomposed at the rate of only 0.2% per day at 100° C., an improvement of an order of magnitude over the unstabilized blank. Another aliquot was further contaminated by adding 1 milligram of aluminum ion per liter of solution and was stabilized as described. This aliquot, too, decomposed at the rate of only 0.2% per day at 100° C., showing that the stabilizer combination of the invention is not harmed by the presence of aluminum ions.

Other polycarboxy amines which can be used with stannates to stabilize hydrogen peroxide in the way shown in the foregoing examples are for instance: monosodium nitrilotriacetic acid, trisodium ethylene diamine-N(beta-hydroxyethyl)-N,N',N'-triacetic acid, and disodium ethylenediamine-N,N'-di-(orthohydroxyphenylacetic acid-N,N'-diacetic acid. These and analogous polycarboxy amines can be used in combination with other stannates in place of sodium stannate used in the examples and with or without a phosphate as previously described. The stannate used, however, should be free from heavy metals which catalyze hydrogen peroxide decomposition. Stannates whose cations exist in only one valence state are a useful class.

Still other variations can be made in the invention which is not limited to the combinations of polycarboxyamines and stannates described by way of illustration nor by any theory presented in explanation of the improved results which are achieved.

I claim as my invention:

1. Aqueous hydrogen peroxide solution of at least about 35% hydrogen peroxide concentration by weight containing between about 1 and about 1000 milligrams of water-soluble polycarboxy amine which contains at least one amino nitrogen atom to which are linked two carboxy groups directly joined to said nitrogen atom by a saturated hydrocarbon group having up to two carbon atoms between the nitrogen atom and carboxy carbon atom together with about 0.5 to about 1000 milligrams of soluble stannate per liter of said aqueous hydrogen peroxide solution.

2. Aqueous hyrogen peroxide solution as in claim 1 wherein the amount of polycarboxy amine is between about 10 and about 100 milligrams per liter of said aqueous hydrogen peroxide solution.

3. Aqueous hydrogen peroxide of at least 90% weight concentration stabilized as in claim 2 wherein the amount of stannate is about 0.5 to about 10 milligrams per liter of said peroxide solution.

4. Aqueous hydrogen peroxide in accordance with claim 1 containing about 1 to about 1000 milligrams of polycarboxy amine, about 0.5 to about 1000 milligrams of stannate and about 10 to about 1000 milligrams of a soluble phosphate per liter of said aqueous hydrogen peroxide solution.

5. Aqueous hydrogen peroxide solution containing about 35% to about 90% hydrogen peroxide by weight in contact with aluminum metal, said solution containing per liter between 0.5 and about 1000 milligrams of soluble stannate and between about 1 and about 1000 milligrams of water-soluble polycarboxy amine having a trivalent amino nitrogen atom to which at least two carboxyl groups are linked by an alkylene hydrocarbon group of not more than two carbon atoms, there being at least one mole of said polycarboxy amine per mole of dissolved aluminum ion in the peroxide solution.

6. Aqueous hydrogen peroxide of at least about 35% weight concentration containing about 1 to about 1000 milligrams of polycarboxyalkyl polyamine salt containing two amine groups linked to adjacent carbon atoms and having not more than two carbon atoms in the hydrocarbon groups linking the carboxy groups to the amine nitrogen atoms together with about 0.5 to about 1000 milligrams of a soluble stannate per liter of said aqueous hydrogen peroxide solution.

7. Aqueous hydrogen peroxide in accordance with claim 6 wherein the stannate is sodium metastannate and the polycarboxy polyamine is ethylene-diamine-N,N,N',N'-tetraacetic acid.

8. Aqueous hydrogen peroxide in accordance with claim 7 in which there is also present about 10 to about 1000 milligrams of a soluble phosphate per liter of said aqueous hydrogen peroxide solution.

9. Aqueous hydrogen peroxide of at least about 35% weight concentration containing about 1 to about 1000 milligrams of 1,2-diaminocyclo-alkane-N,N,N'N'-tetraacetic acid sodium salt and about 0.5 to about 1000 milligrams of soluble stannate per liter of said aqueous hydrogen peroxide solution.

10. Aqueous hydrogen peroxide in accordance with claim 9 containing 1,2-diaminocyclohexane-N,N,N',N'-tetraacetic acid sodium salt together with alkali metal stannate.

11. A method of stabilizing aqueous hydrogen peroxide of at least about 35% weight concentration which comprises adding to the peroxide about 1 to about 1000 milligrams of water soluble polycarboxyalkyl diamine having the two amine groups linked to adjacent carbon atoms and containing not more than three carbon atoms in each of said polycarboxyalkyl groups, together with about 0.5 to about 1000 milligrams of soluble stannate per liter of said aqueous hydrogen peroxide solution.

12. A method of stabilizing at about 100° C. aqueous hydrogen peroxide solution of at least about 35% hydrogen peroxide concentration by weight and containing aluminum ions as impurity which comprises adding to the hydrogen peroxide solution to be stabilized about 1 to about 1000 milligrams of a water-soluble salt of 1,2-diaminocycloalkane-N,N,N',N'-tetraacetic acid together with about 0.5 to about 1000 milligrams of soluble stannate per liter of peroxide solution being stabilized.

References Cited in the file of this patent

UNITED STATES PATENTS

| | | |
|---|---|---|
| 2,008,726 | Reichert | July 23, 1935 |
| 2,961,306 | Johnston | Nov. 22, 1960 |

FOREIGN PATENTS

| | | |
|---|---|---|
| 721,317 | Germany | June 2, 1942 |

OTHER REFERENCES

Chabaret and Martell: "Organic Sequestering Agents," John Wiley and Sons, Inc., New York, June 23, 1959, pages 326–328.